(12) United States Patent
Messina

(10) Patent No.: US 6,920,437 B2
(45) Date of Patent: *Jul. 19, 2005

(54) AUTHENTICATION SYSTEM FOR IDENTIFICATION DOCUMENTS

(75) Inventor: Kevin M. Messina, Nokomis, FL (US)

(73) Assignee: Intelli-Check, Inc., Woodbury, NY (US)

(*) Notice: Subject to any disclaimer, the term of this patent is extended or adjusted under 35 U.S.C. 154(b) by 124 days.

This patent is subject to a terminal disclaimer.

(21) Appl. No.: 10/077,641

(22) Filed: Feb. 15, 2002

(65) Prior Publication Data

US 2002/0143571 A1 Oct. 3, 2002

Related U.S. Application Data

(63) Continuation of application No. 09/236,531, filed on Jan. 25, 1999, now Pat. No. 6,463,416, which is a continuation of application No. 08/680,452, filed on Jul. 15, 1996, now Pat. No. 5,864,623.

(51) Int. Cl.$^7$ .............................................. G06F 17/60
(52) U.S. Cl. ............................ 705/76; 705/64; 705/67; 705/15; 705/16; 235/380
(58) Field of Search ............................ 705/64, 67, 75, 705/76, 15, 16; 235/375, 380

(56) References Cited

U.S. PATENT DOCUMENTS

| 3,569,619 A | 3/1971 | Simjian |
| 3,636,318 A | 1/1972 | Lindstrom et al. |
| 3,702,392 A | 11/1972 | St. Jean |
| 3,868,057 A | 2/1975 | Chavez |
| 3,906,201 A | 9/1975 | Housman et al. |
| 3,956,615 A | 5/1976 | Anderson et al. |
| 3,988,570 A | 10/1976 | Murphy et al. |
| 4,138,057 A | 2/1979 | Atalla |
| 4,186,871 A * | 2/1980 | Anderson et al. ............. 705/71 |
| 4,193,131 A | 3/1980 | Lennon et al. |

(Continued)

FOREIGN PATENT DOCUMENTS

| DE | 2802430 | 7/1978 |
| DE | 3050473 | 9/1986 |
| DE | 4410459 | 2/1995 |
| DE | 19527737 | 2/1996 |
| EP | 0407207 A2 * | 7/1990 |

(Continued)

OTHER PUBLICATIONS

Anonymous, "California Driver's License Readability Supported in New Percon Bar Code and Magnetic Stripe Decoder", PC Business Products, vol. 5, No. 7, Jul. 1993.*
Anonymous, "System Copies Charge Transactions", Computer Retail Week, p. 56, Jul. 7, 1993.*

(Continued)

*Primary Examiner*—John W. Hayes
(74) *Attorney, Agent, or Firm*—Gibbons, Del Deo, Dolan, Griffinger & Vecchione

(57) ABSTRACT

An apparatus that authenticates the contents of identification documents provided by different issuers having machine-readable and/or human readable information is disclosed. The contents of the identification documents are verified without encountering any human error. The verified contents of the identification documents may be used for identification purposes such as age restricted purchases, preordained organ donors or possible criminal prosecution. The verified contents of the identification documents may be logged to provide ID checking compliance and/or may be transferred to a remote computer for additional processing or logging.

26 Claims, 7 Drawing Sheets

U.S. PATENT DOCUMENTS

| | | | |
|---|---|---|---|
| RE30,579 E | | 4/1981 | Goldman et al. |
| 4,304,961 A | | 12/1981 | Campbell, Jr. |
| 4,357,529 A | | 11/1982 | Atalla |
| 4,369,361 A | | 1/1983 | Swartz et al. |
| 4,450,348 A | | 5/1984 | Stockburger et al. |
| 4,453,074 A | | 6/1984 | Weinstein |
| 4,471,216 A | | 9/1984 | Herve |
| 4,506,148 A | | 3/1985 | Berthold et al. |
| 4,629,872 A | | 12/1986 | Hällberg |
| 4,634,846 A | | 1/1987 | Harvey et al. |
| 4,659,914 A | | 4/1987 | Kondo et al. |
| 4,689,477 A | * | 8/1987 | Goldman ............... 235/380 |
| 4,752,676 A | | 6/1988 | Leonard et al. |
| 4,807,287 A | | 2/1989 | Tucker et al. |
| 4,811,393 A | | 3/1989 | Hazard |
| 4,811,408 A | | 3/1989 | Goldman |
| 4,812,628 A | * | 3/1989 | Boston et al. ............ 235/380 |
| 4,816,657 A | | 3/1989 | Stockburger et al. |
| 4,879,747 A | | 11/1989 | Leighton et al. |
| 4,982,072 A | * | 1/1991 | Takigami ............... 235/384 |
| 4,993,068 A | | 2/1991 | Piosenka et al. |
| 4,995,081 A | * | 2/1991 | Leighton et al. ......... 713/186 |
| 5,007,089 A | | 4/1991 | Matyas et al. |
| 5,012,077 A | | 4/1991 | Takano |
| 5,016,192 A | | 5/1991 | Ishido et al. |
| 5,030,117 A | | 7/1991 | Delorme |
| 5,054,077 A | | 10/1991 | Suzuki |
| 5,140,634 A | | 8/1992 | Guillon et al. |
| 5,163,098 A | | 11/1992 | Dahbura |
| 5,172,785 A | | 12/1992 | Takahashi |
| 5,214,699 A | | 5/1993 | Monroe et al. |
| 5,237,611 A | | 8/1993 | Rasmussen et al. |
| 5,249,227 A | | 9/1993 | Bergum et al. |
| 5,259,025 A | | 11/1993 | Monroe et al. |
| 5,267,315 A | | 11/1993 | Narita et al. |
| 5,284,364 A | | 2/1994 | Jain |
| 5,287,181 A | | 2/1994 | Holman |
| 5,321,751 A | | 6/1994 | Ray et al. |
| 5,336,871 A | | 8/1994 | Colgate, Jr. |
| 5,337,358 A | | 8/1994 | Axelrod et al. |
| 5,337,361 A | | 8/1994 | Wang et al. |
| 5,341,428 A | | 8/1994 | Schatz |
| 5,367,148 A | | 11/1994 | Storch et al. |
| 5,367,581 A | | 11/1994 | Abel |
| 5,422,468 A | | 6/1995 | Abecassis |
| 5,429,361 A | | 7/1995 | Raven et al. |
| 5,453,600 A | | 9/1995 | Swartz |
| 5,469,506 A | * | 11/1995 | Berson et al. ........... 713/186 |
| 5,471,533 A | | 11/1995 | Wang et al. |
| 5,490,217 A | | 2/1996 | Wang et al. |
| 5,500,518 A | | 3/1996 | Olzak et al. |
| 5,506,395 A | * | 4/1996 | Eppley ................. 235/486 |
| 5,513,019 A | * | 4/1996 | Cueli .................. 359/2 |
| 5,513,261 A | | 4/1996 | Maher |
| 5,514,860 A | | 5/1996 | Berson |
| 5,546,278 A | | 8/1996 | Bethurum |
| 5,553,143 A | | 9/1996 | Ross et al. |
| 5,559,885 A | | 9/1996 | Drexler et al. |
| 5,590,193 A | | 12/1996 | Le Roux |
| 5,594,226 A | | 1/1997 | Steger |
| 5,610,993 A | * | 3/1997 | Yamamoto .............. 382/124 |
| 5,635,981 A | | 6/1997 | Ribacoff |
| 5,642,485 A | | 6/1997 | Deaton |
| 5,651,066 A | | 7/1997 | Moriyasu et al. |
| 5,661,805 A | | 8/1997 | Miyauchi |
| 5,663,553 A | | 9/1997 | Aucsmith |
| 5,668,874 A | * | 9/1997 | Kristol et al. ........... 713/186 |
| 5,679,940 A | | 10/1997 | Templeton et al. |
| 5,694,471 A | | 12/1997 | Chen et al. |
| 5,706,507 A | | 1/1998 | Schloss |
| 5,712,472 A | | 1/1998 | Lee |
| 5,717,776 A | | 2/1998 | Watanabe |
| 5,721,777 A | | 2/1998 | Blaze |
| 5,722,526 A | * | 3/1998 | Sharrard ................ 194/346 |
| 5,748,908 A | * | 5/1998 | Yu ...................... 705/44 |
| 5,754,939 A | | 5/1998 | Herz et al. |
| 5,770,849 A | | 6/1998 | Novis et al. |
| 5,781,650 A | | 7/1998 | Lobo et al. |
| 5,786,587 A | | 7/1998 | Colgate, Jr. |
| 5,805,849 A | | 9/1998 | Jordan et al. |
| 5,812,664 A | | 9/1998 | Bernobitch et al. |
| 5,838,812 A | * | 11/1998 | Pare et al. ............. 382/115 |
| 5,848,426 A | | 12/1998 | Wang et al. |
| 5,864,623 A | | 1/1999 | Messina et al. |
| 5,991,429 A | | 11/1999 | Coffin et al. |
| 6,070,147 A | * | 5/2000 | Harms et al. ............ 705/14 |
| 6,119,932 A | | 9/2000 | Maloney et al. |
| 6,148,091 A | | 11/2000 | DiMaria |
| 6,169,542 B1 | | 1/2001 | Hooks et al. |
| 6,196,460 B1 | | 3/2001 | Shin |
| 6,363,387 B1 | | 3/2002 | Ponnekanti et al. |
| 6,523,741 B1 | | 2/2003 | DiMaria |

FOREIGN PATENT DOCUMENTS

| | | |
|---|---|---|
| EP | 0187448 | 1/1991 |
| EP | 0683471 | 11/1996 |
| EP | 0991027 | 4/2000 |
| FR | 2571873 | 10/1986 |
| GB | 1546053 | 5/1979 |
| GB | 2067322 | 7/1981 |
| GB | 2136180 | 9/1984 |
| GB | 2332973 | 7/1999 |
| GB | 2359172 | 8/2001 |
| JP | 63138462 | 6/1988 |
| JP | 64055695 | 3/1989 |
| JP | 3100972 | 4/1991 |
| JP | 0050075879 | 3/1993 |
| JP | 7093648 | 4/1995 |
| JP | 00801868 | 4/1996 |
| JP | 090245231 | 9/1997 |
| JP | 11316818 | 11/1999 |
| WO | WO 9412372 | 6/1994 |
| WO | 009412372 | 6/1994 |

OTHER PUBLICATIONS

Anonymous, "Multimedia's Future is Just a Touch Away", Report on IBM, vol. 10, No. 47, Dec. 01, 1993.*

Anonymous, "Technology Adds Functionality to ID Cards: Get Ready to Replace That Bulging Purse or Wallet–Full of Cards With a Single, Multi–Function Card", Automatic I.D. News, p. 32, Apr. 1995.*

Intelli–Check, Inc., "Do You Really Know . . . Who Is Old Enough?" 1997 . . . (2 Pages).

Intelli–Check, Inc., ID–Check™ Online, http://www.intelli-check.com, excerpts taken from http://intellicheck.com/news.htm and http://intellicheck.com/page14.htm. (6 Pages).

Declaration of Russ Embry in Support of the Information Disclosure Statement Containing Deposit Materials For Copyright Registration No. TX–024–479, dated Sep. 7, 2001.

Declaration of Russ Embry in Support of the Information Disclosure Statement Containing Deposit Materials For Copyright Registration No. TX–024–478, dated Sep. 7, 2001.

Complaint Filed in Intelli–Check, Inc. v. Tricom Card Technologies, Inc.

Defendant Tricom Card Technologies' Responses and Objections to Plaintiff Intelli–Check's First Set of Interrogatories filed in Intelli–Check, Inc. v. Tricom Card Technologies, Inc.

Defendant Tricom Card Technologies' Supplemental Responses and Objections to Plaintiff Intelli–Check's First Set of Interrogatories filed in Intelli–Check, Inc. v. Tricom Card Technologies, Inc.

TX–4–024–478 "ID–Check Source Code Listing" Dec. 12, 1994.

TX–4–024–479 "ID Check Source Code Listing" Jul. 10, 1995.

Best Practices Recommendations For The Use Of Magnetic Stripes, Version 2.0 Apr. 1996 by AAMVA (The American Association of Motor Vehicle Administratiors).

New auto–entry rules don't make crossing any easier, Lazaroff Leon, Apr. 1993.

Software license agreements in Spain, Ulloa Gonzaol, 04, 1993.

Natural Language, Work–Group Computing Report, Jan. 1992.

On The Horizon, Barry Gerber, Network Computing, 1995.

IBM OS–2 with graphic interface, Electronic News, Nov. 1998.

Expert Report of Ray Streckenrider, dated Sep. 8, 2004.

The Rebuttal Report of Victor Zazzu, dated Oct. 6, 2004.

Expert Rebuttal Report of Ray Streckenrider, dated Oct. 18, 2004.

* cited by examiner

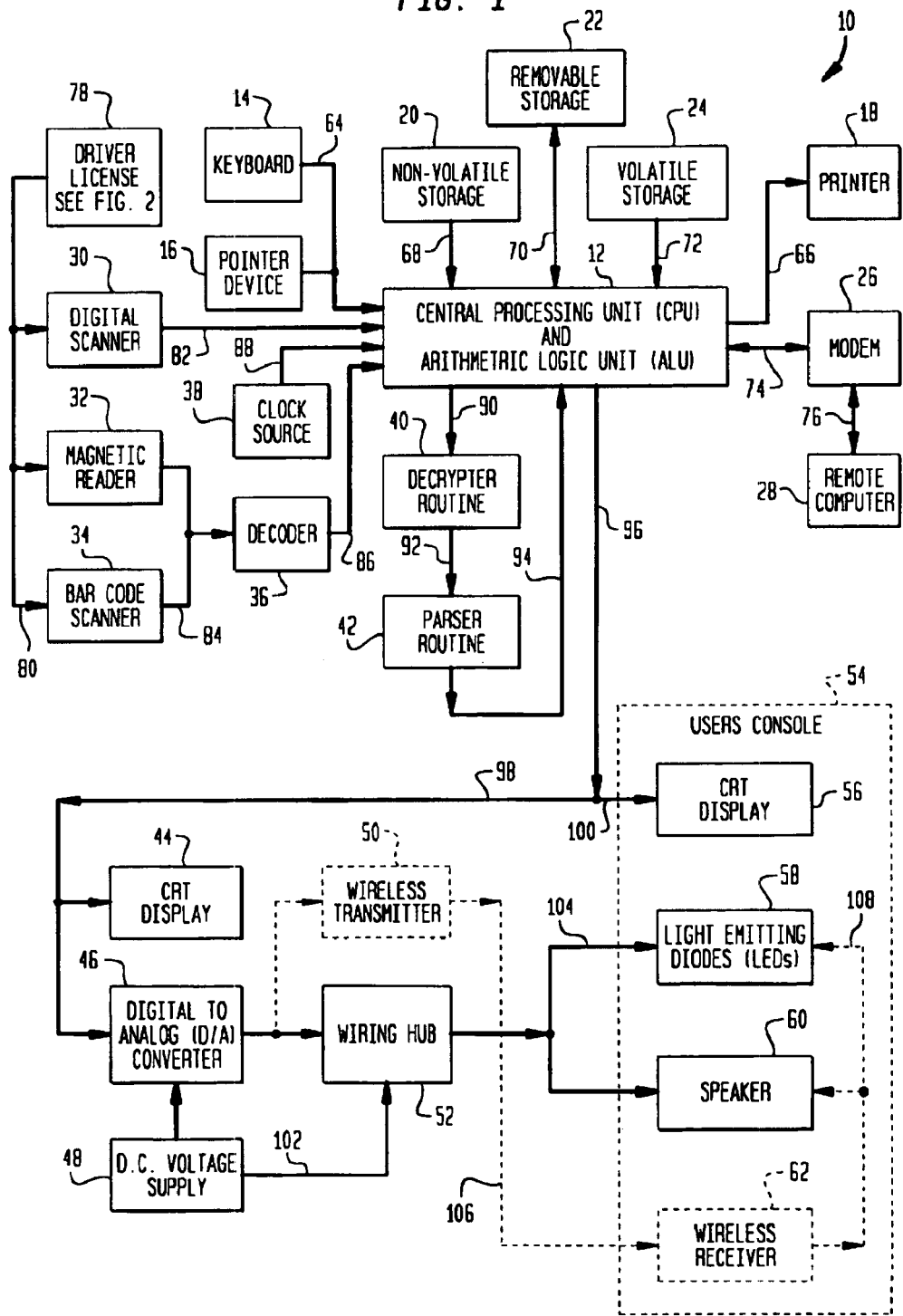

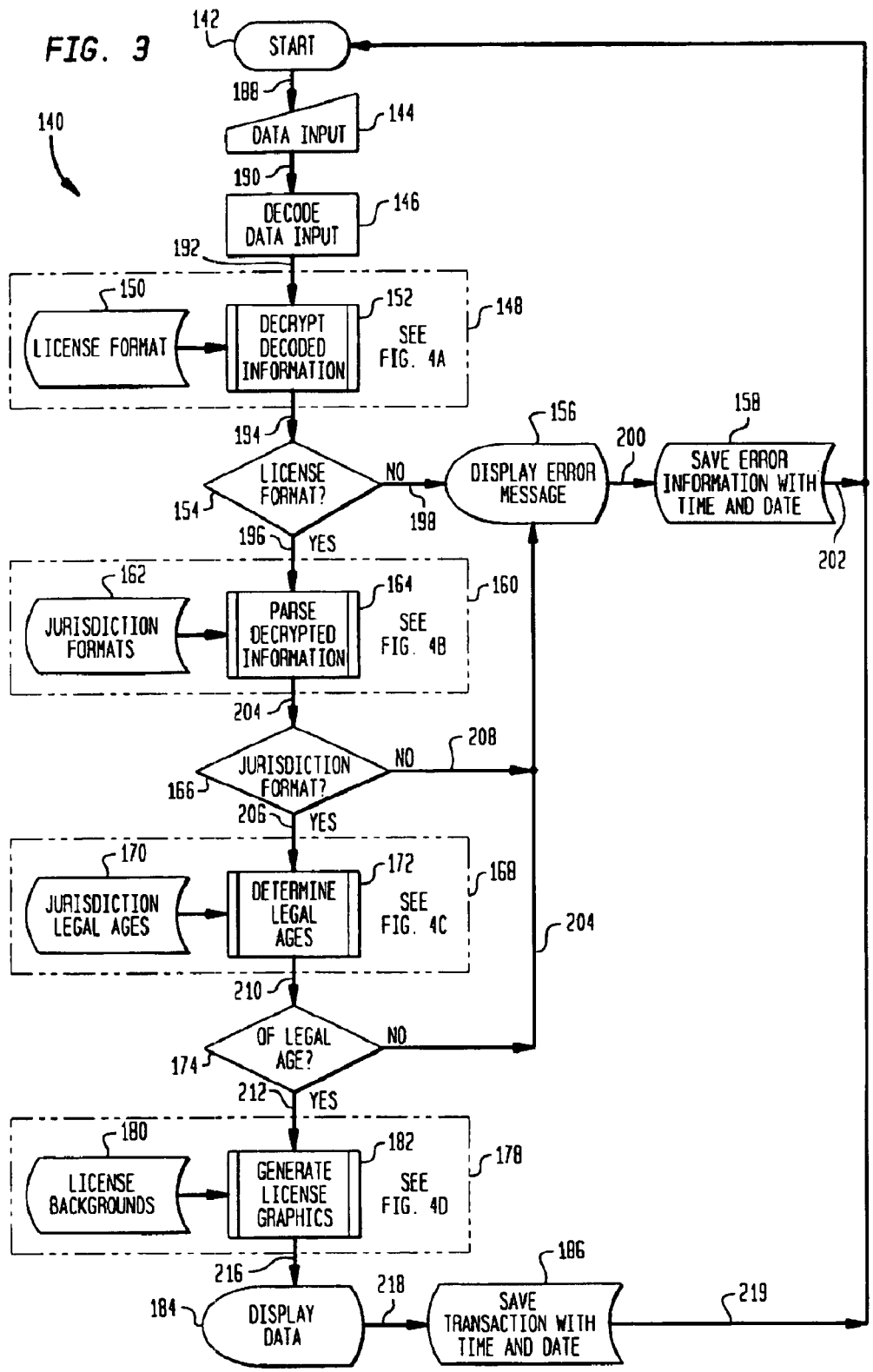

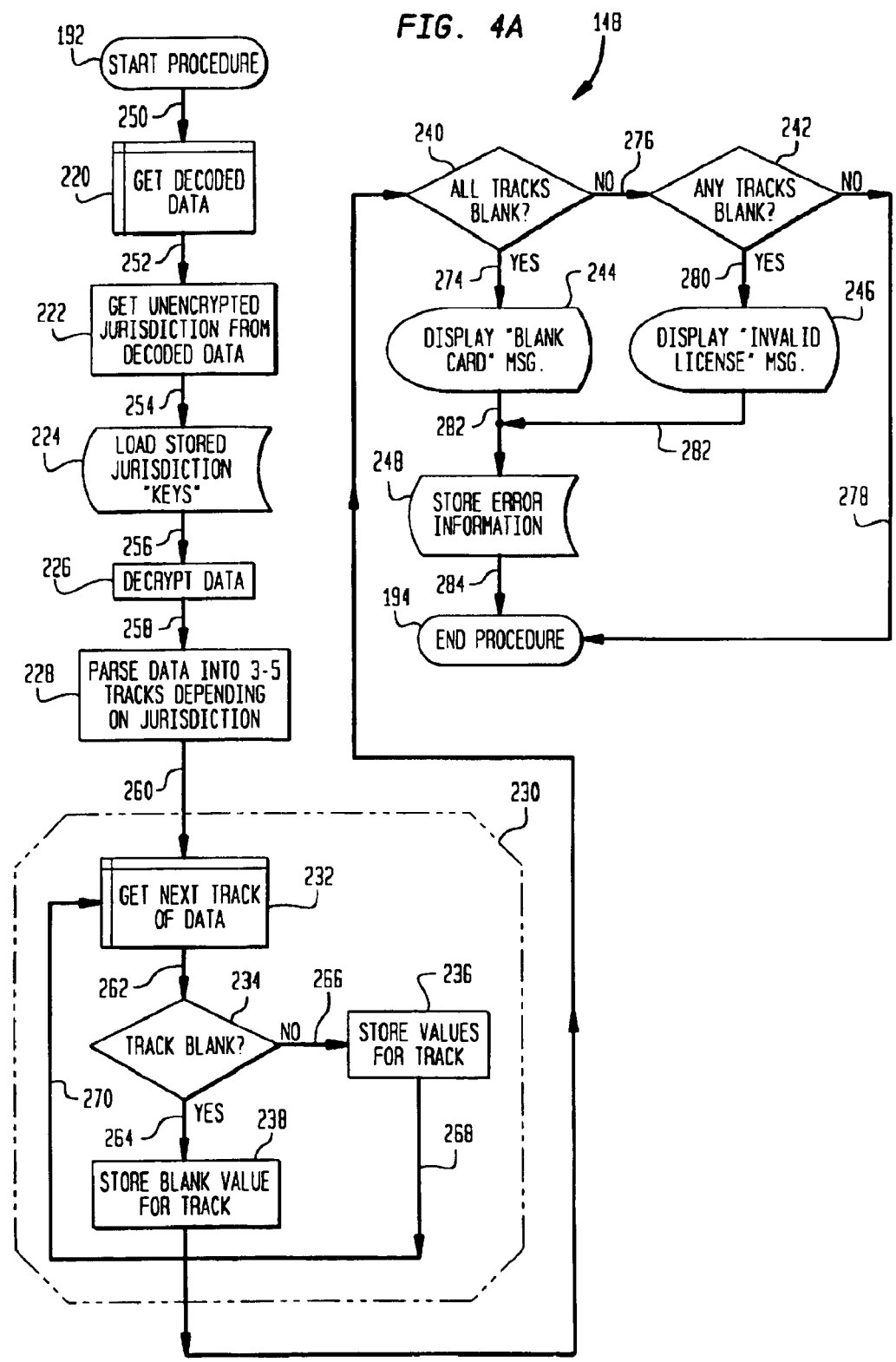

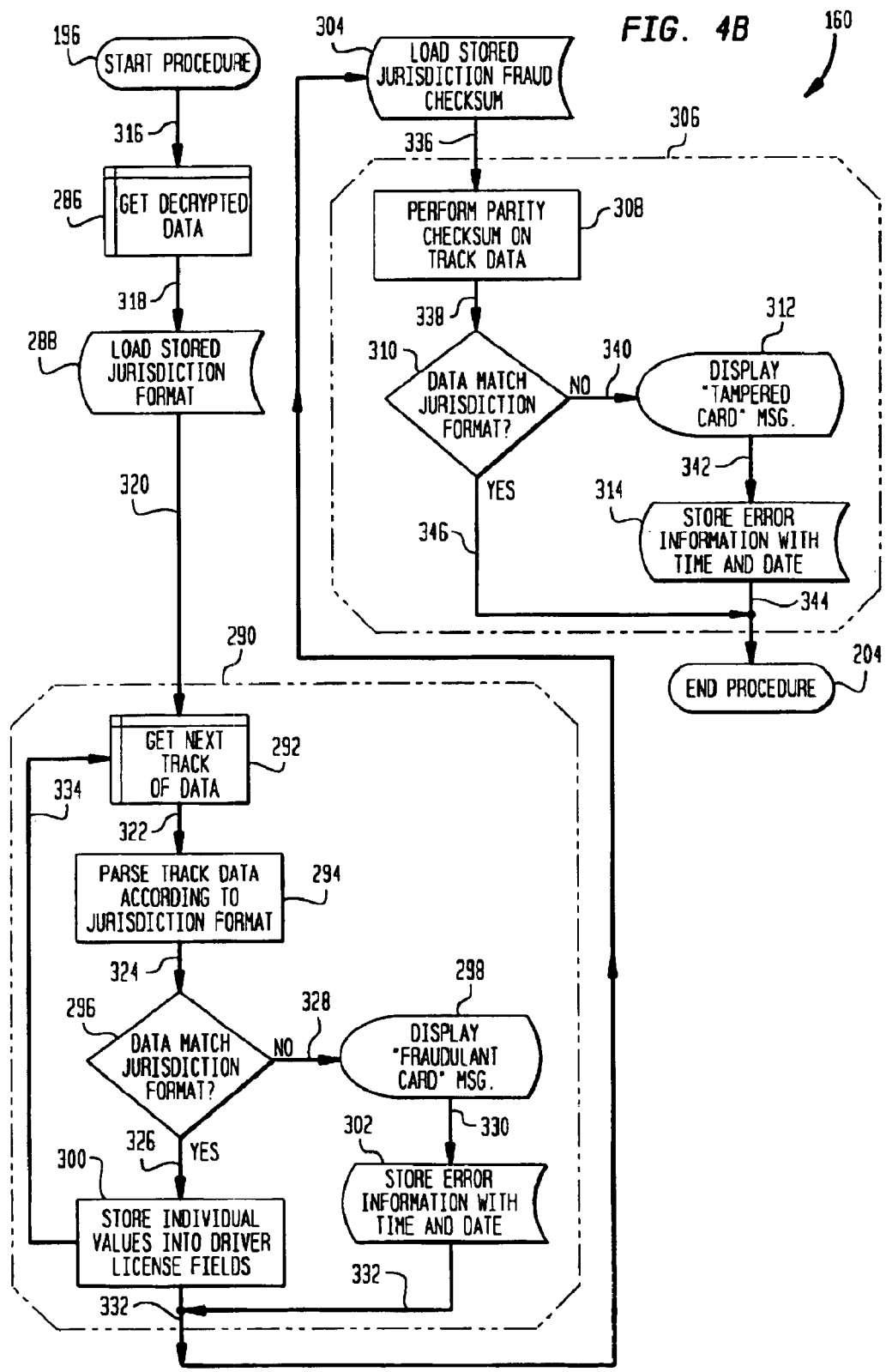

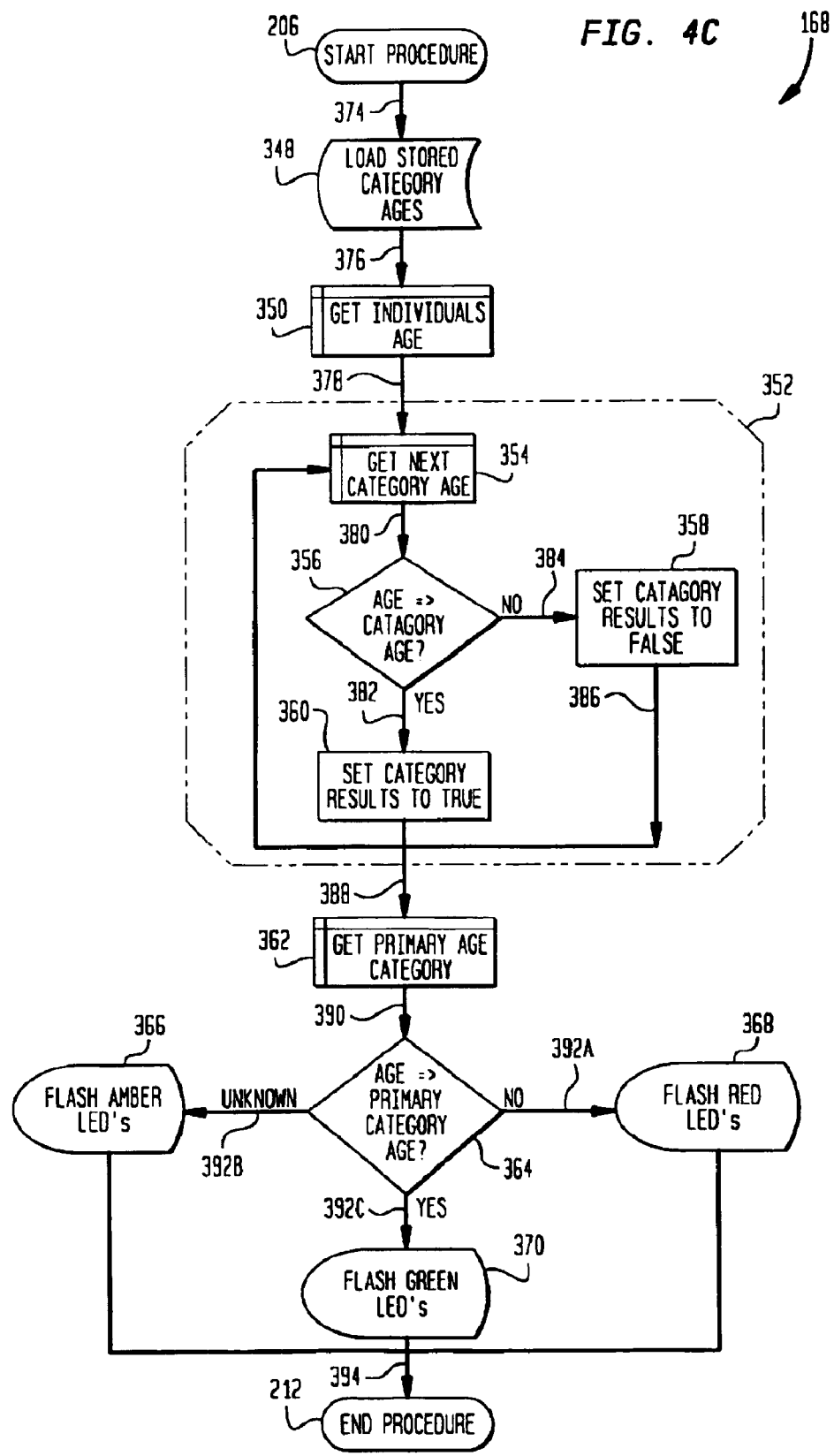

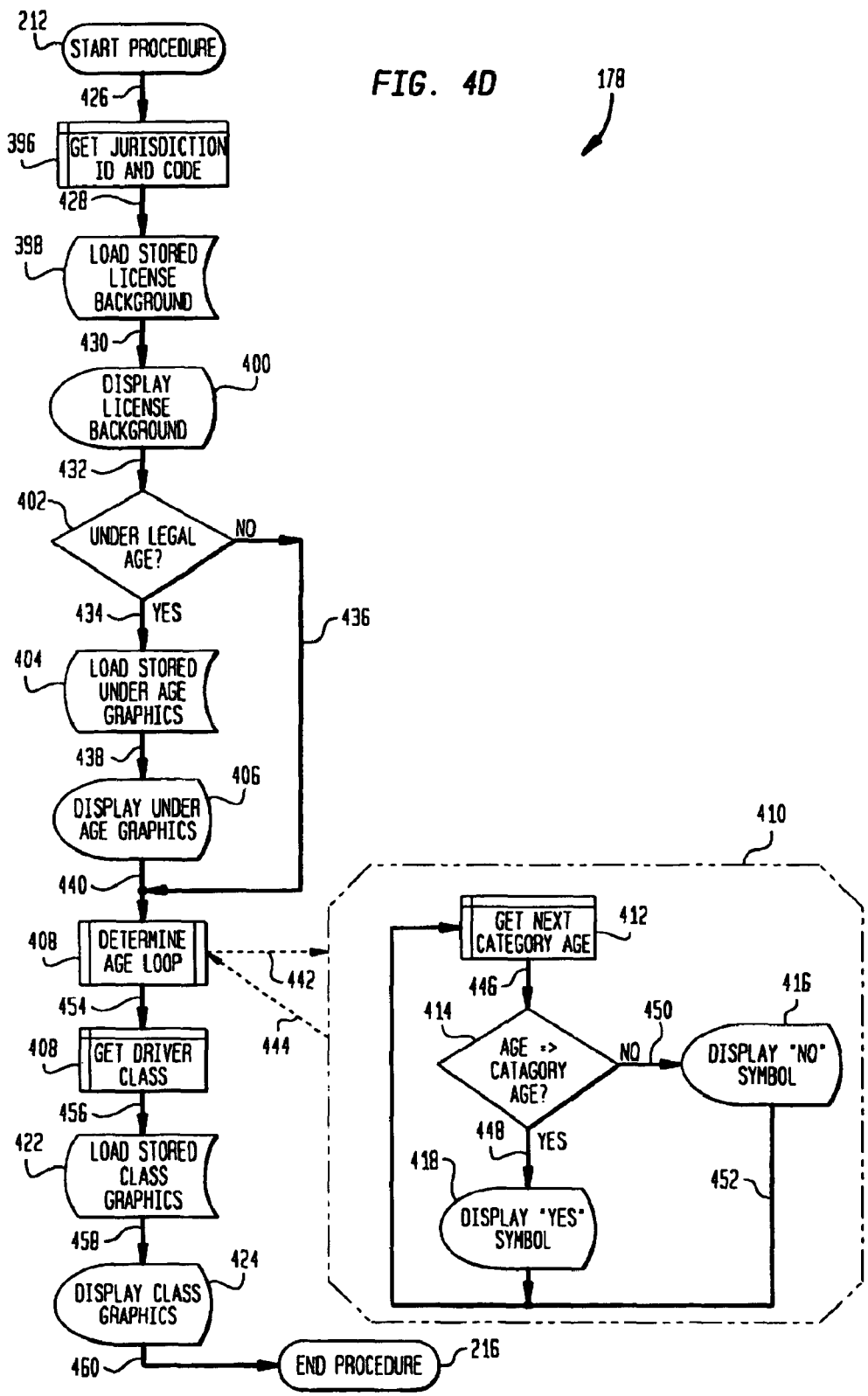

AUTHENTICATION SYSTEM FOR IDENTIFICATION DOCUMENTS

CROSS-REFERENCES TO RELATED APPLICATIONS

This application is a continuation of application Ser. No. 09/236,531 filed on Jan. 25, 1999, now U.S. Pat. No. 6,463,416, which is a continuation of application Ser. No. 08/680,452 filed on Jul. 15, 1996, now U.S. Pat. No. 5,864,623 which are incorporated herein by reference.

BACKGROUND OF THE INVENTION

1.0 Field of the Invention

The present invention generally relates to an identification system for documents. More particularly, the present invention relates to a programmable apparatus for authenticating drivers' licenses used for identification purposes. Specifically, the present invention relates to a programmable apparatus that identifies the contents of the driver licenses used for identification purposes without any human error and allows the information carried by the driver licenses to be transferred to a remote location for further identification purposes.

2.0 Description of Related Art

The problem of rampant and readily available fake identification cards, more particularly, driver licenses/identification cards, has caused many retailers fines, sometimes imprisonment, loss of tobacco and liquor licenses, and has even subjected them to other forms of civil and criminal liability. Over the course of years, various attempts have been made to prevent or detect the use of fake identification cards, but not with a great deal of success. To help prevent the use of fake identification, since 1992 the United States and Canada have been issuing new driver licenses in accordance with an international North American Free Trade Agreement (NAFTA) standard created and enforced by the American Association of Motor Vehicle Administrators (AAMVA). These new driver licenses/identification cards have embedded coded, or even encrypted coded information, with machine readable formats that conform to the NAFTA standards. It is desired that means be provided that authenticate the contents of these identification cards so as to safeguard the retailer against the penalties that may otherwise be encountered by fake identification cards.

The use of driver licenses has expanded over the years to serve as identification for various applications, such as for the purchase of alcohol, tobacco or lottery products, as well as for gambling in casinos, off-track betting (OTB), movie theaters and user-definable events, such as allowing the ingress into liquor establishments. All of these fields have an age requirement for the purchase of a product at the point-of-transaction or for ingress into an establishment and the driver license is the document used to provide age identification and all age verification is commonly accomplished in a relatively quick manner. It is desired that means be provided that easily decides a driver licenses authenticity so that any purchase of a product having an age requirement is satisfied at the time of purchase and in a quick and convenient manner.

As is known, driver licenses are accompanied with photo identification of the particular driver, and in addition to the identification supplied by a driver license to a liquor retailer, the driver license is frequently used for other identification purposes, such as for providing proper identification for check cashing. The frequent use of driver licenses allows the licenses to serve as tools to detect or uncover individuals who are being sought out because of being subject to pending criminal prosecution. It is desired that means be provided to allow the information on the driver licenses to be transferred to a local or remote jurisdiction to help identify and detect individuals that may be classified as being offenders against the criminal law of the associated jurisdiction.

Driver licenses not only serve for identification for commercial transactions, but also serve a humanitarian need of identifying preordained organ donors that may be involved in tragic accidents. It is desired for humanitarian purposes that means be provided to transfer the organ donor information commonly present on driver licenses to a local or remote jurisdiction so that an available organ donor may be quickly matched to an individual in need of the now-available organ.

Driver licenses are commonly used in places of business, such as convenience stores, liquor stores, entertainment centers which also have personal computers for use in business purposes, such as inventory management. It is desired that means be provided so that personal computers may be readily adapted to serve as an integral part of an authentication system for driver licenses.

OBJECTS OF THE INVENTION

It is a primary object of the present invention to provide an authentication system to authenticate driver licenses that are coded with machine readable information conforming to AAMVA standards.

It is a further object of the present invention to provide an authentication system for not only verifying the contents of a driver license, but also allowing for the information to be transferred to a local or remote jurisdiction so that it may be identified for criminal prosecution purposes or, conversely, for humanitarian purposes, such as for identifying preordained organ donors.

It is another object of the present invention to provide an identification system that utilizes personal computers that are commonly found in places of business having a need for authenticating the contents of a driver license used for identification purposes.

SUMMARY OF THE INVENTION

The present invention is directed to an authentication system that verifies the contents of documents, such as driver licenses.

The authentication system comprises a programmable apparatus that verifies the contents of the document embodying both human recognizable information and machine recognizable coded information. The apparatus comprises means for reading, means for parsing, means for comparing and means for displaying. The information of the document is read by the means for reading and directed into the programmable apparatus. The means for parsing reads the information of the document in the programmable apparatus and parses such information into the jurisdictional segments each having predetermined values. The means for comparing analyze the information against the predetermined values and generates a verification signal if the information and the values match. The means for displaying displays the verification signal.

BRIEF DESCRIPTION OF THE DRAWINGS

FIG. 1 is a block diagram of the programmable apparatus of the present invention.

FIG. 3 is a flow diagram of the overall operation of the programmable apparatus.

FIG. 4 is composed of FIGS. 4(A), 4(B), 4(C) and 4(D), that respectively illustrates one of the four (4) primary program subroutines making up the overall operation illustrated in FIG. 3.

DETAILED DESCRIPTION OF THE PREFERRED EMBODIMENTS

Figure 2A:
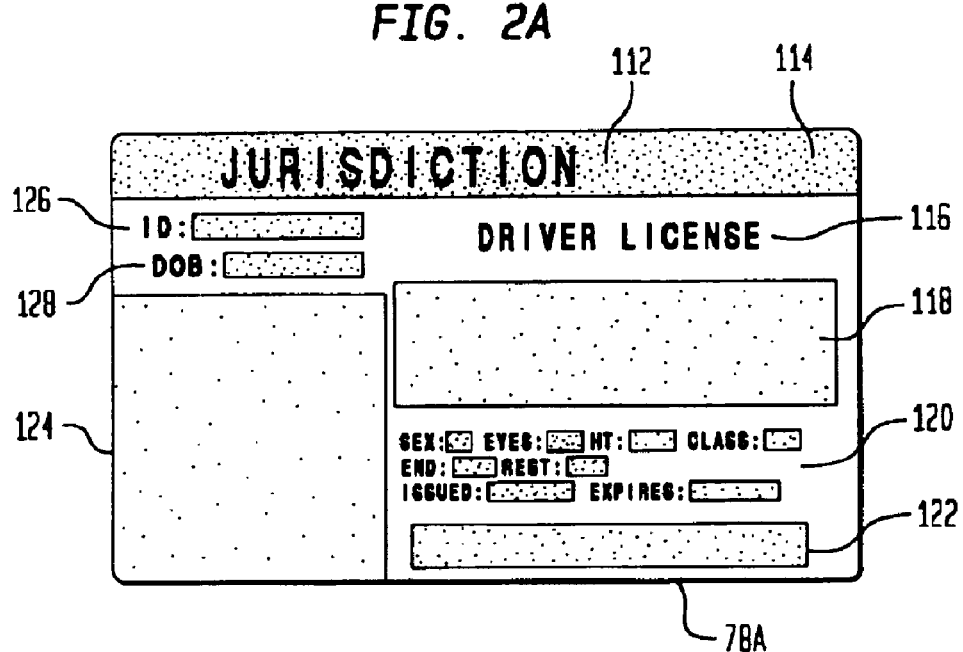
FIG. 2 is composed of FIGS. 2(A) and 2(B) that illustrate the human recognizable and machine recognizable formats carried by driver licenses related to the present invention.

With reference to the drawing, wherein the same reference numbers indicate the same elements throughout, there is shown in FIG. 1 a block diagram of a programmable apparatus comprising a computer 12, more particularly, a central processing unit and arithmetic logic unit whose actions are directed by computer programs comprising a series of operational steps performed on information read into the computer 12.

In general, the programmable apparatus authenticates a document embodying information comprising both human recognizable information and machine recognizable information comprising a series of codes. The programmable apparatus comprises means for reading the information of the document into the programmable apparatus, means for parsing the read document information into jurisdictional segments each having predetermined values, and means for comparing the read information of the document against the predetermined values and generating at least a verification signal on a display means, if the information of the document and the predetermined values match. The programmable apparatus comprises a plurality of conventional elements arranged in a non-conventional manner with all elements being listed in Table 1.

TABLE 1

| REFERENCE NO. | ELEMENT |
| --- | --- |
| 12 | CENTRAL PROCESSING UNIT (CPU) AND ARITHMETIC LOGIC UNIT (ALU) |
| 14 | KEYBOARD |
| 16 | POINTER DEVICE |
| 18 | PRINTER |
| 20 | NON-VOLATILE STORAGE |
| 22 | REMOVABLE STORAGE |
| 24 | VOLATILE STORAGE |
| 26 | MODEM |
| 28 | REMOTE COMPUTER |
| 30 | DIGITAL SCANNER |
| 32 | MAGNETIC READER |
| 34 | BAR CODE SCANNER |
| 36 | DECODER |
| 38 | CLOCK SOURCE |
| 40 | DECRYPTER ROUTINE |
| 42 | PARSER ROUTINE |
| 44 | CRT DISPLAY |
| 46 | DIGITAL-TO-ANALOG (D/A) CONVERTER |
| 48 | D.C. VOLTAGE SUPPLY |
| 50 | WIRELESS TRANSMITTER |
| 52 | WIRING HUB |
| 54 | USER'S CONSOLE |
| 56 | CRT DISPLAY |
| 58 | LIGHT EMITTING DIODES (LEDs) |
| 60 | SPEAKER |
| 62 | WIRELESS RECEIVER |

The keyboard 14 and the pointer device 16, such as a mouse, provide a means for the operator or user to enter information, via signal path 64, into the CPU 12. The printer 18 converts the outputs, present on signal path 66, of the central processing unit 12 into printed images.

The non-volatile storage 20, the removable storage 22, and the volatile storage 24 are all storage mediums, whose contents are controlled and updated by the central processing unit 12, via signal path 68, 70 and 72 respectively. The non-volatile storage 20 and the removable storage 22 provide for permanent recordings of every transaction involved with or determined by the CPU 12, whereas the volatile storage 24 provides temporary storage of information while it is being processed by the CPU 12. The removable storage 22 may be a disk that is insertable and removable from the CPU 12.

The modem 26 is interconnected to the CPU 12 by way of signal path 74 and allows the CPU 12 to share its input and manipulated data, as well as the contents of its storage information, with the remote computer 26, via the signal path 76, which is typically established by a telephone communication link.

The digital scanner 30, magnetic reader 32, and bar code scanner 34 are each capable of reading the information on the identification card 78, to be more fully described with reference to FIG. 2, that is routed to these reading devices, via path 80. The digital scanner 30 converts the information on identification card 78 to machine understandable codes via a conventional optical character recognition technique and routes such converted information to the CPU 12 via the signal path 82. The magnetic reader 32 and the bar code scanner 34 each read the information present on the identification card 78 and supply respective output signals that are routed to decoder 36, via signal path 84 which, in turn, supplies machine readable signals to the CPU 12 via signal path 86. The signal paths 82 and 86 may be provided by wireless devices, such as, the wireless transmitter 50 and wireless receiver 62 both being conventional and both to be further described hereinafter. The usage of wireless devices may be advantageous if the digital scanner 30, magnetic reader 32 and bar code scanner 34 are remotely located relative to the CPU 12.

A clock source 38 supplies the clock signal, via signal path 88, to the CPU 12 that, in response to an appropriate computer program routine, establishes the time and date in which the information present on signal path 82, 84, 86 or 88 is read into and/or stored on the storage medium 20, 22 or 24. The CPU 12 under the direction of its computer programs, to be more fully described with reference to FIGS. 3 and 4, routes the information of the identification card 78, preferably encrypted as to be described hereinafter, via signal path 90 to the decrypter routine 40. The decrypter routine 40 decrypts the information and routes its non-crypted information, via signal path 92, to a parser routine 42 which parses the information into jurisdictional segments, to be further described with reference to FIGS. 3 and 4, each having predetermined values. The parsed information is directed back to the CPU 12 via signal path 94. The CPU 12, performs a series of operations, under the direction of its computer programs, and provides, among other things, at least a verification signal, as well as human recognizable information that is placed on signal path 96 and routed to a first CRT display 44 via signal path 98 and to a second CRT display 56 via signal path 100.

The human recognizable information on signal path 98 also preferably contains a digital signal representation that is routed to the digital-to-analog (D/A) converter 46, which converts the digital representation into an analog signal representative of an audio signal. The digital signal representation also contains at least three bits each representative of verification signal conditions, such as YES, NO, and UNKNOWN to be used to respectfully flash GREEN, RED and AMBER LEDs of the LED array 58 to be further described with reference to FIG. 4(C). The digital-to-analog converter 46 is preferably excited by a D.C. voltage supply 48 which is also routed, via signal path 102, to a wiring hub 52 that also accepts the audio signal and the three bits (YES, NO and UNKNOWN) developed by the D/A converter 46. The wiring hub 52 is of a conventional type that arranges the received power and signal sources into appropriate cables, such as cable 104, that routes the representative audio signal from the D/A converter 46 to the speaker 60 and the three digital bits (YES, NO and UNKNOWN) as well as the excitation signal of the D.C. voltage supply 48 to the light emitting diode array 58. The wiring hub 52 may also include a switch that controls the on-off state of the excitation signal of the D.C. power supply 48 applied to one of the light emitting diodes 58 (and also to the CRT display 56 and speaker 60) so that the on-off power state of all elements 56, 58 and 60 may be remotely controlled from the wiring hub 52.

The speaker 60 may be a piezoelectric device that when activated by the audio signal developed by D/A converter 46 generates a buzzing sound that alerts an individual at the user's console 54 that the information (to be further described with reference to FIGS. 3 and 4) being displayed on either or both of the CRT displays 44 and 56 is not authentic. The CRT displays 44 and 56 are preferably of the type that is capable of handling text and graphics of the Super Video Graphics Array (SVGA) and/or National Television Standards Committee (NTSC).

The audio signal and the three bits (YES, NO and UNKNOWN) of the D/A converter 46 previously discussed and a signal representative that power is available from the D.C. voltage supply 48 may also be applied to the speaker 60 and light emitting diode array 58, by way of the wireless transmitter 50 cooperating with the wireless receiver 62 and interconnected thereto by signal path 106, with the output of the wireless receiver 62 being routed, via signal path 108, to speaker 60 and the light emitting diode array 58. The wireless transmitter 50, wireless receiver 62 and signal paths 106 and 108 are shown in phantom to indicate the alternate embodiment formed by the conventional wireless devices 50 and 62.

Figure 2B:
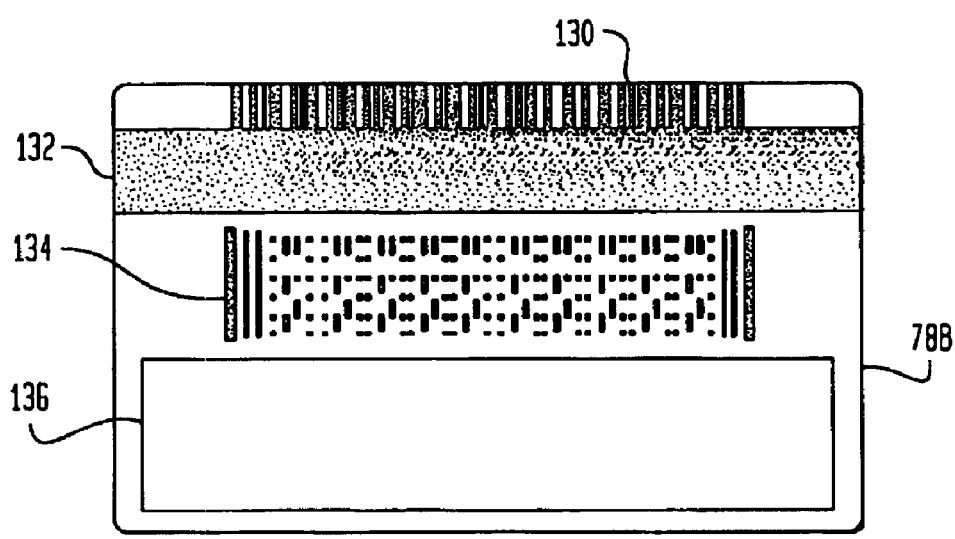

The speaker 60, and the CRT display 56 are both part of a user's console 54 and allow a user, such as a retailer to visually verify the authenticity of the information present on the identification card 78, such as a driver license, embodying human recognizable information and machine recognizable information generally illustrated in FIG. 2 which is comprised of FIGS. 2(A) and 2(B) that respectively show the front face 78A and the rear face 78B, each embodying information that is given in Table 2.

TABLE 2

| REFERENCE NO. | INFORMATION |
|---|---|
| 112 | JURISDICTION (U.S. (STATE) OR CANADA (PROVINCE)) |
| 114 | GRAPHIC OR LOGO OF JURISDICTION |
| 116 | DOCUMENT TYPE |
| 118 | NAME AND ADDRESS OF INDIVIDUAL OF THE DOCUMENT |
| 120 | PARTICULARS OF THE INDIVIDUAL OF THE DOCUMENT |
| 122 | SIGNATURE OF INDIVIDUAL OF THE DOCUMENT |
| 124 | PHOTOGRAPH OF INDIVIDUAL OF THE DOCUMENT |
| 126 | IDENTIFICATION NUMBER OF DOCUMENT |
| 128 | DATE OF BIRTH (DOB) |
| 130 | US128 BAR-CODE |
| 132 | MAGNETIC STRIP |
| 134 | ANSI-20.1; 1993 CHARACTER SET OR 2D BAR CODE PDF-417 |
| 136 | JURISDICTIONAL TEXT |

The information given in Table 2 is read into the CPU 12 via signal paths 82 or 86 and the machine readable information 130, 132 and 134 on face 78B is preferably encrypted in a format preferably specified by ANSI-20.1; 1993 character set. The information 134 may also be encrypted in a format in accordance to a 2D bar code known as PDF-417 defined by the Symbol Technology Corporation of New York. The information 132 is also preferably decrypted and readable by the ANSI-20.1; 1993 Character Set and more fully described in "Recommendation for use of Magnetic Stripe on Drivers License" which is part of the NAFTA standard created and enforced by AAMVA which has been in existence in the United States and Canada since 1992 and is herein incorporated by reference.

In general, the operating programs residing in the CPU 12 authenticate the information embodied in the document, such as a driver license 78, having the particulars given in Table 2 each located at a predetermined region of the driver license 78 and corresponding to those of an individual and to those of a state or province in the United States or Canada, respectively, in which the individual legally resides but which are generally referred to herein as a jurisdiction. The particulars of the individual include height, weight, date of birth, sex and organ donor consent, whereas the particulars of the jurisdiction may include the state or province emblem or voting information. Further, the driver license 78 also includes graphics defining a background and/or a logo of the driver license 78. The operating program residing in the CPU 12 that authenticates these particulars and are comprised of a plurality of program segments represented by an overall sequence 140 illustrated in FIG. 3 and tabulated in Table 3.

TABLE 3

| REFERENCE NO. | PROGRAM SEGMENT |
|---|---|
| 142 | START EVENT |
| 144 | DATA INPUT |
| 146 | DECODE DATA INPUT |
| 148 | SUBROUTINE FOR HANDLING OF LICENSE FORMAT |
| 150 | LICENSE FORMAT |
| 152 | DECRYPT DECODED INFORMATION |
| 154 | LICENSE FORMAT DETECT |
| 156 | DISPLAY ERROR MESSAGE |
| 158 | SAVE ERROR INFORMATION WITH TIME AND DATE |
| 160 | SUBROUTINE FOR HANDLING OF JURISDICTION FORMAT |
| 162 | JURISDICTION FORMATS |
| 164 | PARSE DECRYPTED INFORMATION |

TABLE 3-continued

| REFERENCE NO. | PROGRAM SEGMENT |
| --- | --- |
| 166 | JURISDICTION FORMAT DETECT |
| 168 | SUBROUTINE FOR HANDLING OF LEGAL AGES |
| 170 | JURISDICTION LEGAL AGE |
| 172 | DETERMINE LEGAL AGES |
| 174 | OF LEGAL AGE |
| 178 | SUBROUTINE FOR HANDLING OF LICENSE BACKGROUND |
| 180 | LICENSE BACKGROUNDS |
| 182 | GENERATE LICENSE GRAPHICS |
| 184 | DISPLAY DATA |
| 186 | SAVE TRANSACTION WITH TIME AND DATE |

The overall sequence 140 of FIG. 3 comprises the plurality of elements and has four (4) major subroutines 148, 160, 168 and 178 to be further described hereinafter respectively with reference to FIGS. 4(A), 4(B), 4(C) and 4(D). As used herein with reference to FIGS. 3 and 4, the program segments, sometimes referred to herein as processing segments, are shown as being interconnected by signal path and control is passed from one program segment to another when the output information of one program segment is placed on the signal path connected to the other program segment.

As seen in FIG. 3, and with simultaneous reference to FIG. 1, the overall program 140 is started by event 142 which initiates the reading of input data via signal path 82 or 86 of FIG. 1. With again reference to FIGS. 1, 2 and 3, the information embodied in driver license card 78 is read into CPU 12 via the digital scanner 30, magnetic reader 32 or bar code scanner 34 and represents the program segment 144 (input data) of FIG. 3. The operating program of CPU 12 routes the input data to program segment 146 via signal path 190 which, in turn, decodes the input data 144 and supplies the decoded information on signal path 192 to program segment 152.

The program segment 152 is part of subroutine 148, to be further described, that receives license format information from license format 150 and decrypts the information therein and provides such as the output of subroutine 148.

The output of subroutine 148 is applied to signal path 194 to program segment 154 which, like program segments 166 and 174, is a decisional segment which detects if the license format of the driver license 78 is correct, and if the format of the driver license 78 is correct, supplies the license format information to the processing segment 164 via signal path 196, but if the driver license 78 format is invalid, supplies the invalid license format on signal path 198 so that it is displayed on both CRT displays 44 and 56 shown in FIG. 1 as a display error message 156. The activation of the CRT displays 44 and 56 for the display error message 156, as well as other error displays and messages, is controlled by the CPU 12 servicing the input/output ports connected to the CRT displays 44 and 56. The displayed error message 156 is placed on signal path 200 which is routed to program segment 158 so that the error message is saved along with its time and date and the program segment 158 returns control to the start event 142 via signal path 202.

The program segment 164 is part of subroutine 160, to be further described, and receives jurisdiction formats information that is decrypted from program segment 162 which is also part of subroutine 160. The program segment 164 parses the decrypted information into jurisdictional segments having predetermined values, to be described with reference to FIG. 4(B). The program segment 164 supplies the decrypted information via signal path 204 to jurisdiction format detect program segment 166 which, in turn, detects if the jurisdictional format information 162 is correct, and if the information is correct, then the correct information is routed to program segment 172 via signal path 206, but if the information is incorrect then, the incorrect information is routed, via signal path 208, to the display error message program segment 156 which displays such an error on the CRT displays 44 and 56 of FIG. 1 and supplies that display error message to signal path 200 previously described.

The processing segment 172 is part of subroutine 168, to be further described, and receives jurisdictional legal ages information from program segment 170 which is also part of subroutine 168. Program segment 172 determines if the legal age requirements of the jurisdiction are met by the date of birth information of the driver license 78 and then sends its determined information, via signal path 210 to decisional segment 174. If the decisional segment 174 detects that the legal age has been satisfied, it routes this information onto program segment 182 via signal path 212, but if the legal age information is incorrect, then an error notification (display error message) is routed to program segment 156 via signal path 204. Program segment 156 responds in a manner as previously described.

The processing segment 182 is part of subroutine 178, to be further described, and receives the license background of the particular jurisdiction from program segment 180, also part of subroutine 178. The program segment 182 generates license graphics and places such on signal path 216 applied to program segment 184 which, in turn, is transferred as output displays to the CRT displays 44 and 56 of FIG. 1. Program segment 184 applies its output on signal path 218 which in turn, is routed to program segment 186 which saves the transaction along with its time and date. The processing segment 186 provides notification, via signal path 219 to the next start event 142 which, in turn, causes the sequence of the next overall segment 140 having four subroutines, the first of which may be further described with reference to FIG. 4(A) which is comprised of a plurality of program segment tabulated in Table 4.

TABLE 4

| REFERENCE NO. | PROGRAM SEGMENT |
| --- | --- |
| 220 | GET DECODED DATA |
| 222 | GET UNENCRYPTED JURISDICTION FROM DECODED DATA |
| 224 | LOAD STORED JURISDICTION "KEYS" |
| 226 | DECRYPT DATA |
| 228 | PARSE DATA INTO 3–5 TRACKS DEPENDING ON JURISDICTION |
| 230 | READING TRACK DATA LOOP |
| 232 | GET NEXT TRACK OF DATA |
| 234 | TRACK BLANK |
| 236 | STORE VALUES FOR TRACK |
| 238 | STORE BLANK VALUES FOR TRACK |
| 240 | ALL TRACKS BLANK |
| 242 | ANY TRACKS BLANK |
| 244 | DISPLAY "BLANK CARD" MESSAGE |
| 246 | DISPLAY "INVALID LICENSE" MESSAGE |
| 248 | STORE ERROR INFORMATION |

The subroutine 148 of FIG. 4(A) is initiating with start procedure event 192 and is terminated with the end procedure event 194, wherein events 192 and 194 correspond to the signal paths shown in FIG. 3. It should be noted that program segments 150 and 152 shown in FIG. 3 as making up subroutine 148 are not shown in the programming functions performed by segments 150 and 152 are integrated and blended into the plurality of elements of FIG. 4(A). This same rationale is applicable to the program segments 162–164, 170–172 and 180–182 of FIG. 3 that have been blended into the program segments of FIGS. 4(B), 4(C), and 4(D) respectively to be further described hereinafter.

With reference to FIG. 4(A), the output of start procedure event 192 is applied to signal path 250 which is routed to program segment 220. The program segment 220 retrieves the decoded data shown in FIG. 3 as program segment 146 (decode data input) and provides such information on signal path 252 which is applied to program segment 222.

Program segment 222 retrieves the unencrypted jurisdiction data specified in the decoded data of program segment 220 and routes such information on signal path 254 which is applied to program segment 224. Program segment 224 loads the jurisdiction "keys" which identifies a record for the jurisdictional segment. More particularly, the "keys" identify the tracks on the storage mediums 20, 22, 24 where jurisdiction segments are stored so that the license format of the jurisdiction segment under consideration may serve as the predetermined values of subroutine 148 to which the format of the data of the driver license 78 read into the CPU 12 may be compared and authenticated as being correct. The comparison and authentication of the predetermined values of the jurisdictional segments is also accomplished for subroutines 160, 168 and 178 to be described.

The information loaded by program segment 224 is applied to signal path 256 that is routed to program segment 226 which decrypts the data it receives from program segment 224 and routes such decrypted data on signal path 258 which, in turn, is applied to program segment 228.

The program segment 228 parses the data into 3–5 tracks, dependent on the jurisdictional segment specified by the decoded data of program segment 220. The parsed data of program segment 228 is applied to signal path 260 which, in turn, is applied to program segment 232 which is part of the reading track data loop 230 which is repetitively repeated 3–5 times dependent upon the jurisdictional segment specified by the data of program segment 220. More particularly, for example, if one jurisdiction (representative of a state in the United States or of a province in Canada) requires three (3) tracks of storage, loop 230 is repetitively repeated three (3) times.

The first program segment 232 of loop 230 retrieves the next or first track of data of the information present on signal path 260 and routes such information to decisional segment 234 which, if the track information is blank, provides that determination on signal path 264 and, conversely, if the track is not blank provides that determination on signal path 266 which is applied to program segment 236. Program segment 236 stores the values for the retrieved track of data and after it is stored applies an appropriate signal on signal path 268 to pass control to program segment 238 that also has signal path 264 from program segment 234 applied thereto.

Program segment 238 stores the blank value for the retrieved track. If all blank values have not been stored then program segment 238 returns control to program segment 232 by way of signal path 270 but, if all blank values have been stored then program segment 238 passes control to program segment 240 via signal path 272.

Program segment 240 determines if all the tracks assigned for the particular jurisdiction under consideration are blank and if so provides knowledge thereof on signal path 274. Conversely, if all tracks are not blank, the program segment 240 passes control, via signal path 276, to program segment 242.

Program segment 242 determines if any tracks are blank and if the answer is yes then provides a notification thereof on signal path 280 however, if the answer to the question "any tracks blank" is no, (which signifies a correct condition) then program segment 242 passes control to the end procedure event 194 via signal path 278 which, in turn, returns to the overall step-by-step procedure 140 shown in FIG. 3. If signal path 274 or 280 is activated, then program segment 244 or 246, respectively, is activated and an alarm message is displayed on the CRT displays 44 and 56 of FIG. 1 and then control is passed to program segment 248. Program segment 248 stores the alarm message of program segment 244 or 246 and then passes control to signal path 284 which, in turn, provides notification to the end procedure event 194 which allows the program to return to the overall procedure 140 of FIG. 3. The program segment 140 of FIG. 3 sequences until it reaches signal path 196 which initiates the subroutine 160 of FIG. 4(B) that is comprised of a plurality of program segments that are tabulated in Table 5.

TABLE 5

| REFERENCE NO. | PROGRAM SEGMENT |
|---|---|
| 286 | GET DECRYPTED DATA |
| 288 | LOAD STORED JURISDICTION FORMAT |
| 290 | PROGRAM LOOP FOR GATHERING TRACK DATA FOR JURISDICTION FORMAT |
| 292 | GET NEXT TRACK OF DATA |
| 294 | PARSE TRACK DATA ACCORDING TO JURISDICTION FORMAT |
| 296 | DATE MATCHED JURISDICTION FORMAT |
| 298 | DISPLAY "FRAUDULENT CARD" MESSAGE |
| 300 | STORE INDIVIDUAL VALUES INTO DRIVER LICENSE FIELDS |
| 302 | STORE ERROR INFORMATION WITH TIME & DATE |
| 304 | LOAD STORED JURISDICTION DATA FRAUD CHECKSUM |
| 306 | PROGRAM LOOP FOR PERFORMING PARITY CHECKSUM |
| 308 | PERFORM PARITY CHECKSUM ON TRACK DATA |
| 310 | DATA MATCHED JURISDICTION FORMAT |
| 312 | DISPLAY "TAMPERED CARD" MESSAGE |
| 314 | STORE ERROR INFORMATION WITH TIME & DATE |

As seen in FIG. 4(B) the subroutine 160 is initiated by start procedure event 196 and terminated by end procedure event 204 each of which events corresponds to the signal path having the same reference number shown in FIG. 3. The notification of the start procedure event 196 is applied on signal path 316 which is routed to program segment 286 which, in turn, retrieves the decrypted data originally loaded into the CPU via program segment 144 of FIG. 3. Program segment 286 activates signal path 318 that is routed to program segment 288 which loads the stored jurisdictional format defining the format related to the jurisdiction of the individual specified in the driver license 78 loaded into the CPU 12. After such loading, program segment 288 passes control over to program loop 290 via signal path 320.

The first segment of loop 290 is program segment 292 which retrieves the first or next track of data defined by program segment 288 and passes control over to program segment 294 via signal path 322. Program segment 294 parses the retrieved track data according to the particular jurisdictional format under consideration and passes control over to program 296 via signal path 324.

Program segment 296 is a decisional segment that matches the data from program segment 292 to the jurisdictional format under consideration, and if a proper match exists passes control over to program segment 300 via signal path 326, but if a match does not occur, passes control over to program segment 298 via signal path 328.

Program segment 298 causes the display of the message "fraudulent card" on the CRT displays 44 and 56 of FIG. 1 and then passes control over to program segment 302 via signal path 330. Program segment 302 stores the error information along with its time and date and passes control over to program segment 304 via signal path 332.

Program segment 300 receive control from signal paths 326 and 332 and stores the individual values of the driver license data read into the CPU 12 into the driver license fields in the CPU 12.

Program segment 300 returns control, via signal path 334, to program segment 292 which, as previously mentioned, is the first step of loop 290. Loop 290 has a repetitive cycle between 3 to 5 times dependent on the jurisdictional segment and for each repetitive cycle program segment 300 passes control over to program segment 292 via signal path 334, and when loop 290 is complete, program segment 300 passes control over to program segment 304 via signal path 332. The interaction of loop 290 serves as a fraudulent check which in actuality detects any counterfeit documents.

Program segment 304 loads the stored jurisdiction checksum and and passes control over to program loop 306 having a first program segment, that is, program segment 308. The checksum determines if the data has been tampered with or altered after having been officially issued.

Program segment 308 performs the parity checksum on the track data received from program segment 304 and then passes control onto program segment 310 via signal path 338.

Program segment 310 performs a data match of the jurisdictional format and if the data is not correct passes control over to program segment 312 via signal path 340. Program segment 312 causes the CPU 12 to activate the CRT displays 44 and 56 of FIG. 1 and display the error message "tampered card" and then passes control over to program segment 314 via signal path 342. Program segment 314 stores the error information along with its time and date and passes control to end procedure event 204 via signal path 344. End procedure event 204 also receives control from program segment 310 via signal path 346 if the data match jurisdictional format performed by program segment 310 is correct. End procedure event 204 returns control back to the overall program segment 140 of FIG. 3 which sequences to subroutine 168 of FIG. 4(C) which is comprised of a plurality of program segments which are tabulated in Table 6.

TABLE 6

| REFERENCE NO. | PROGRAM SEGMENT |
|---|---|
| 348 | LOAD STORED CATEGORY AGENTS |
| 350 | GET INDIVIDUAL'S AGE |
| 352 | PROGRAM LOOP FOR GATHERING CATEGORY AGE |
| 354 | GET CATEGORY AGE |
| 356 | AGE => CATEGORY AGE |
| 358 | SET CATEGORY RESULTS TO FALSE |
| 360 | SET CATEGORY RESULTS TO TRUE |

TABLE 6-continued

| REFERENCE NO. | PROGRAM SEGMENT |
|---|---|
| 362 | GET PRIMARY AGE CATEGORY |
| 364 | AGE => PRIMARY CATEGORY AGE |
| 366 | FLASH AMBER LED |
| 368 | FLASH RED LED's |
| 370 | FLASH GREEN LED's |

As seen in FIG. 4(C), the subroutine 168 is initiated by the start procedure event 206 and is terminated by the end procedure event 212, with the events corresponding to signal paths 206 and 212 of FIG. 3. The occurrence of the start procedure event 206 is applied upon signal path 374 which notifies program segment 348. Program segment 348 loads the stored category ages related to the particular jurisdictional segment under consideration, and then passes control over to program segment 350 via signal path 376. The category ages may include the legal age for drinking and voting.

Program segment 350 retrieves the individual's age from the initial data read into the CPU 12 by program segment 144 of FIG. 3. The program segment 350 passes, via signal path 378, control over to the program loop 352 which is repetitively performed 5 times and has a first program segment 354.

Program segment 354 retrieves or gets the next or first category age of program segment 350 and passes, via signal path 380, control over to program segment 356. Program segment 356 determines if the age of the individual is within the category of ages for the jurisdictional segment, and if the answer is yes, then passes control over to program segment 360 via signal path 382 and, conversely, if the category age is not correct passes control over to program segment 358 via signal path 384. Program segment 358 sets the category results false, and then passes, via signal path 386, control back to program segment 354 which, as previously discussed, is the first program segment of the loop 352.

Once the loop is iterated 5-times, then either program segment 358 or 356 passes control over to program segment 362, via signal path 388.

Program segment 362 retrieves the primary age category, that is, for example, the legal age of drinking in the particular jurisdiction, and then passes control to program segment 364 via signal path 390.

Program segment 364 determines the age of the individual designated by the contents of the driver license 78 read into the CPU 12, and, more particularly, determines if the age is below the required legal age. Program segment 364 in its determination sets one of the three (3) digital bits previously discussed with regard to the D/A converter 46 that is past onto the LED array 58, both previously described with reference to FIG. 1. If the age of the individual does not at least equal that required by the jurisdiction for the selected category, such as drinking, program segment 364 passes control over to the program segment 368, via signal path 392A, which causes the CPU 12 to have a RED indicator of the LED array 58 flashed. If program segment 364 is unable to determine the age category, it passes, via signal path 392B, control over to program segment 366 which, in turn, causes the CPU 12 to have the amber LED of the LED array 58 flashed. If program segment 364 determines the primary age to be correct, program segment 364 passes control over to program segment 370, via signal path 392C. Program segment 370 causes the CPU 12 to have the green LED of the LED array 58 flashed. Once the LED flashing is completed, program segment 370 passes, via signal path 394, control over to the end procedure event 212 which, in turn, allows the subroutine 168 to be returned to the overall program segment 140 of FIG. 3 which, in turn, allows the program segment 140 to sequence to subroutine 178 which may be further described with reference to FIG. 4(B) comprised of a plurality of program segments that are tabulated in Table 7.

TABLE 7

| REFERENCE NO. | PROGRAM SEGMENT |
| --- | --- |
| 396 | GET JURISDICTION ID & CODE |
| 398 | LOAD STORED LICENSE BACKGROUND |
| 400 | DISPLAY LICENSE BACKGROUND |
| 402 | UNDER LEGAL AGE |
| 404 | LOAD STORED UNDER AGE GRAPHICS |
| 406 | DISPLAY UNDER AGE GRAPHICS |
| 408 | DETERMINE AGE LOOP |
| 410 | PROGRAM LOOP FOR DETERMINE AGE CATEGORY |
| 412 | GET NEXT CATEGORY AGE |
| 414 | AGE => CATEGORY AGE |
| 416 | DISPLAY "NO" SYMBOL |
| 418 | DISPLAY "YES" SYMBOL |
| 420 | GET DRIVER CLASS |
| 422 | LOAD STORED CLASS GRAPHICS |
| 424 | DISPLAY CLASS GRAPHICS |

As seen in FIG. 4(D), the subroutine 178 is initiated with the start procedure event 212 and terminated with the end procedure event 216 which correspond to the signal paths 212 and 216 of FIG. 3. The occurrence of the start procedure event 212 is passed to the program segment 396 by way of signal path 426.

Program segment 396 retrieves the jurisdiction identification (ID) and the code of the driver license 78, which is a code indicating the AAMVA assigned Jurisdiction Number and a Code which denotes which security encryption key was used by that jurisdiction at the time of encrypting. Program segment 396, after its completion, passes control over to program segment 398 via signal path 428.

Program segment 398 loads the stored license background that was read into CPU 12 by the program segment 144 of FIG. 3. Program segment 398 passes control over to program segment 400 by way of signal path 430.

Program segment 400 displays the license background on the CRT displays 44 and 56 of FIG. 1 and passes control over to program segment 402 via signal path 432.

Program segment 402 determines if the age on the driver license is, for example, under 21 (Legal Age) and if the answer is yes, passes control over to program segment 404 via signal path 434, but if the answer is no, passes control to program segment 408 via signal path 436.

Program segment 404 loads the stored under age graphics and passes control over to program segment 406 via signal path 438 which causes the CPU 12 to have the CRT displays 44 and 56 of FIG. 1 display the under age graphics. The under age graphics may be selected to attract the attention of the user of the authentication system 10 of the present invention. After such display the program segment 406 passes control over to program segment 408 via signal path 440.

Program segment 408 is an age determining segment loop which is accomplished by a program loop 410 interlinked to program segment 408 via signal paths 442 and 444.

The first program segment of program loop 410 is program segment 412 which retrieves the next age category which, for example, may be the age for smoking and passes control over to program segment 414 via signal path 446.

Program segment 414 determines if the age of the individual of the driver license 78 read into the CPU 12 is equal to or greater than the category age. The categories include alcohol, tobacco, lottery, gambling and custom guidelines used for casino or for entrance into an entertainment facility. If the answer of program segment 414 is yes, program segment 414 passes control over to program segment 418 via signal path 448, but if the answer is no, program segment 414 passes control over to program segment 416 via signal path 450.

Program segment 416 causes the CPU to provide the "no" symbol on the CRT displays 44 and 56 of FIG. 1, whereas program segment 418 causes the CPU 12 to cause the display of the "yes" symbol on the same CRT displays 44 and 56. The "yes" and "no" symbols may be selected to attract the attention of the user of the authentication system 10 of the present invention. The program loop 410 is typically and repetitively repeated five (5) times and upon such completion passes control back to the program segment 408 via signal path 444.

Program segment 408 after its completion passes control over to program segment 420 via signal path 454.

Program segment 420 retrieves the driver class designation and passes control over to program segment 422 via signal path 456. Program segment 422 loads the stored driver class graphics and passes control over to program segment 424 via signal path 458.

Program segment 424 causes the CPU 12 to display the class graphics on the CRT displays 44 and 56 of FIG. 1 and upon its completion passes, via signal path 460 control to end procedure event 216 which is also shown as signal path 216 of FIG. 3.

As seen in FIG. 3, the signal path 216 notifies the program segment 184 of the generation of license graphics which, in turn, passes control over to program segment 186 via signal path 218 which, in turn, passes control back to the start event 142, via signal path 220 so that the overall program 140 of FIG. 3 may be repeated, if necessary.

It should now be appreciated that the practice of the present invention provides for an authentication system 10 to authenticate driver licenses that are coded with machine readable information in accordance with AAMVA standards, as well as coded with human recognizable information.

It should be further appreciated that the present invention, not only verifies the contents of driver licenses but also allows the information contained in the CPU 12 to be transferred to a remote or local jurisdiction, via modem 26, to remote computer 28 so that the information may be identified for criminal prosecution purposes or, conversely, for humanitarian purposes, such as, for identifying preordained organ donors. The identification for criminal or humanitarian purposes may be accomplished in a manner similar to that hereinbefore described with reference to FIGS. 1–4.

Furthermore, it should be appreciated that the present invention provides the means for not only rapidly authenticating a document, such as a driver license, but also allowing the driver license to serve as a convenient means for rapidly verifying that age requirements are satisfied in any purchase at the point-of-transaction or in allowing ingress into establishments having their own age requirements.

Further still, it should be appreciated that the practice of the present invention utilizes a personal computer, such as CPU 12, commonly found in many places of businesses used for inventory purposes but also having a need to authenticating the contents of a driver license, such as authenticating identification for credit card and check writing at the point-of-sale. Further uses could be to authenticate driver licenses in police cars, ports of entry such as domestic and internal airports, sea ports, rail stations and border check-points. Attached to existing locking mechanisms, could be integrated into lottery, tobacco and alcohol vending machines and to points of entry to buildings and other sensitive areas. Verifying identity is also important: to other areas such as child day care centers and Post Offices to verify parcel pick-up and drop-off.

I claim:

1. An apparatus for reading information from a driver license for use in an age-related activity comprising:
   an information reader for reading machine readable information from said driver license;
   a processor responsive to said machine readable information read by said information reader and operable to execute instructions to
   (a) determine an identifier corresponding to an issuing jurisdiction of the driver license from said read information,
   (b) extract date of birth and expiration date information from said read information based on an organizational format corresponding to said determined identifier,
   (c) check at least one of the extracted date of birth and extracted expiration date information for conformance to predetermined values so as to provide either a successful check for conformance or alternatively, an unsuccessful check for conformance, and
   (d) calculate an age in response to said successful check for conformance by instruction (c); and
   a display responsive to said processor and operable to display at least said calculated age in response to said successful check for conformance by instruction (c) and, alternatively, to indicate said unsuccessful check for conformance by instruction (c).

2. The apparatus of claim 1 wherein the processor also executes at least one instruction to determine and verify parity checksum of said read information.

3. The apparatus of claim 1 wherein the processor also executes at least one instruction to check for an absence of expected information in said read information based on said determined identifier.

4. The apparatus of claim 3 wherein said instruction to check for the absence of expected information is a check for blank tracks.

5. The apparatus of claim 1 wherein the determine instruction further determines jurisdiction character set information and the check instruction further checks the jurisdiction character set information for conformance to associated values.

6. The apparatus of cairn 1 wherein the processor is further operable to execute at least one instruction to cause the display to indicate said expiration date.

7. The apparatus of claim 1 wherein the processor is further operable to execute at instructions to extract driver license number information and to execute instructions to cause the display to indicate said driver license number.

8. The apparatus of claim 1 wherein said age restricted activity is age verification of a bearer of said driver license at an ingress to an establishment with an age requirement.

9. The apparatus of claim 8 wherein said establishment is a gambling establishment.

10. The apparatus of claim 1 wherein said apparatus is coupled to a vending machine of tobacco and/or alcohol products.

11. The apparatus of claim 1 wherein said age restricted activity is the age verification of a bearer of said driver license at a point of sale for tobacco and/or alcohol products.

12. The apparatus of claim 1 wherein said information reader is a magnetic reader.

13. The apparatus of claim 1 wherein said information reader is a bar code reader.

14. A method for reading information from a driver license for use in an age-restricted activity comprising the steps of:
   (a) reading machine readable information from a driver license;
   (b) determining an identifier corresponding to an issuing jurisdiction of the driver license from said read information;
   (c) extracting date of birth and expiration date information from said read information based on an expected organizational format corresponding to said determined identifier;
   (d) checking at least one of the date of birth and expiration date information for conformance to predetermined values so as to provide either a successful check for conformance or, alternatively, an unsuccessful check for conformance;
   (e) calculating an age and displaying at least said calculated age in response to said successful check for conformance by instruction (d); and
   (f) displaying an indication of said unsuccessful check for conformance by instruction (d).

15. The method of claim 14 further comprising the step of determining and verifying parity checksum of said read information.

16. The method of claim 14 further comprising the steps of checking for an absence of expected information in said read information based on said determined identifier.

17. The method of claim 16 wherein said checking step includes checking for blank tracks.

18. The method of claim 14 wherein said determining step further comprises determining jurisdiction character set information and said checking step further checks the character set information for conformance to associated values.

19. The method of claim 14 further comprising the step of displaying said expiration date.

20. The apparatus of claim 14 further comprising the step of displaying said driver license number.

21. The method of claim 14 further comprising the step of displaying an indication for granting or denying a driver license bearer ingress to an establishment with an age requirement.

22. The method of claim 21 wherein said establishment is a gambling establishment.

23. The method of claim 14 wherein said method further comprises the step of providing a vend or no-vend signal to a tobacco and/or alcohol product vending machine.

24. The method of claim 14 wherein said age restricted activity is the age verification of said bearer at a point of sale for tobacco and/or alcohol products.

25. The method of claim 14 wherein said reading step further comprises reading magnetic tracks of said driver license.

26. The method of claim 14 wherein said reading step further comprises reading optical machine readable information on said driver license.

* * * * *